United States Patent

Bödiger et al.

Patent Number: 6,057,394
Date of Patent: *May 2, 2000

[54] THERMOPLASTIC COMPOSITIONS WITH IMPROVED X-RAY CONTRAST

[75] Inventors: Michael Bödiger; Herbert Eichenauer, both of Dormagen; Heinrich Alberts, Odenthal; Dieter Wittmann, Leverkusen; Thomas Eckel, Dormagen; Peter Krüger, Leverkusen, all of Germany

[73] Assignee: Bayer Aktiengesellschaft, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/754,995

[22] Filed: Nov. 22, 1996

[30] Foreign Application Priority Data

Dec. 5, 1995 [DE] Germany .............. 195 45 289

[51] Int. Cl.⁷ .................................... C08K 3/30
[52] U.S. Cl. ................................................ 524/423
[58] Field of Search .................. 523/220; 524/409, 524/435, 492, 496, 502

[56] References Cited

U.S. PATENT DOCUMENTS

| | | | |
|---|---|---|---|
| 3,889,033 | 6/1975 | Tanaka | 428/323 |
| 3,976,605 | 8/1976 | Matsunaga | 260/2.5 |
| 3,978,019 | 8/1976 | Oelmann | 524/496 |
| 4,001,379 | 1/1977 | Turk | 524/267 |
| 4,154,899 | 5/1979 | Hershey | 428/537 |
| 4,526,910 | 7/1985 | Das | 524/502 |
| 4,644,988 | 2/1987 | Ahmad | 524/496 |
| 5,026,758 | 6/1991 | Grigo | 524/423 |
| 5,104,731 | 4/1992 | Gager | 428/323 |
| 5,202,209 | 4/1993 | Winnik | 430/106.6 |
| 5,207,703 | 5/1993 | Jain | 606/232 |
| 5,298,546 | 3/1994 | Kirsch | 524/423 |
| 5,334,471 | 8/1994 | Sacripante | 430/106.6 |
| 5,409,980 | 4/1995 | Myszak | 524/409 |
| 5,412,019 | 5/1995 | Roulstone | 524/413 |
| 5,629,369 | 5/1997 | Guerra | 524/492 |
| 5,648,407 | 7/1997 | Goetz | 524/435 |
| 5,695,901 | 12/1997 | Selim | 430/106.6 |
| 5,714,536 | 2/1998 | Ziolo | 524/430 |

FOREIGN PATENT DOCUMENTS

| | | |
|---|---|---|
| 5207703 | 6/1978 | Canada . |
| 0335159 | 10/1989 | European Pat. Off. . |
| 0416407 | 3/1991 | European Pat. Off. . |
| 0419927 | 4/1991 | European Pat. Off. . |
| 155775 | 5/1979 | Germany . |

OTHER PUBLICATIONS

Forsch. Rontegenstr. 128.6 (1978) pp. 758–762).
Physical Polymer Science, J. Wiley & Sons, 1986, p. 123.

*Primary Examiner*—Paul R. Michl
*Attorney, Agent, or Firm*—Connolly Bove Lodge & Hutz

[57] ABSTRACT

Thermoplastic moulding compositions containing

A. a thermoplastic polymer and

B. 0.1 to 50% by weight, with respect to A, of an inorganic substance with an average particle diameter of 0.1 to 100 nm, and the use of superfine inorganic substances as defined by B for increasing the X-ray contrast of thermoplastic moulding compositions comprising A and B.

8 Claims, No Drawings

THERMOPLASTIC COMPOSITIONS WITH IMPROVED X-RAY CONTRAST

The present invention relates to mixtures of thermoplastic polymers and superfine inorganic substances, which, in addition to an improved X-ray contrast, exhibit good mechanical properties.

The detection of plastics parts in the human body, e.g. a plastics toy which has been swallowed, or plastics particles which have been driven into tissue due to accidents, is gaining in importance.

One method of detecting foreign bodies in the human organism is X-ray diagnostics. Conventional plastics consist to a predominant extent of elements with low atomic numbers (At. No.), such as carbon (At. No.=6), hydrogen (At. No.=1), oxygen (At. No.=8) and nitrogen (At. No.=7). The effective atomic numbers of plastics are thus similar to that of water, so that the X-ray density of conventional plastics and water are comparable. Many conventional plastics are therefore substantially transparent to X-rays in living tissue.

Elements having a higher atomic number can be employed in plastics to increase the X-ray density, e.g. chlorine (At. No.=17) in polyvinyl chloride, silicon (At. No.=14) in silicones and fluorine (At. No.=9) in polyfluorocarbons. Of the conventional plastics, only polyvinyl chloride exhibits sufficient contrast for X-ray diagnostics, due to its high chlorine concentration (Forsch. Röntgenstr. 128,6 (1978) 758–762).

Another option for increasing the X-ray density is the use of fillers such as glass fibres ($SiO_2$), or of colorants or pigments which consist of elements with higher atomic numbers, e.g. $TiO_2$ (Ti: At. No.=22).

Compounds which contain atoms of high atomic number (X-ray contrast agents), such as $BaSO_4$ (Ba: At. No.=56) or organic iodine compounds (iodine: At. No.=53), are used in medicine to make particular body structures visible by means of X-ray diagnostics. X-ray contrast agents also facilitate ultrasound diagnostics and computer tomography.

$BaSO_4$ may be subsequently incorporated, for example, in order to achieve the effective X-ray imaging of various plastics, particularly those without elements of higher atomic number (At. No.>8).

If $BaSO_4$ is incorporated in polymers, experience has shown that the X-ray contrast is significantly improved compared with the unfilled polymer. However, conventional fillers drastically impair the toughness and are completely unsuitable for transparent polymers (haze).

It has been found that, by comparison with corresponding conventional substances, when special superfine substances are used to obtain an X-ray contrast the toughness is impaired considerably less, the resistance to thermal deformation and the resistance to petrol are increased, and the transparency is substantially maintained. Moreover, the X-ray contrast of the moulding compositions according to the invention is sharper than that of moulding compositions filled with conventional minerals.

According to the invention, all filler materials, e.g. pigments, colorants, fibres, are suitable for increasing the X-ray contrast, provided that they contain elements, the atomic number of which is at least 5, preferably at least 15, and most preferably at least 25 greater than that of the element with the highest atomic number in the plastic used, and provided that their average diameter is 0.1 to 100 nm. Superfine $BaSO_4$ is particularly suitable.

The present invention relates to thermoplastic moulding compositions containing:

A. at least one thermoplastic polymer selected from a styrene-containing polymer and a condensation polymer of bifunctional reactive compounds, preferably polycarbonate and/or polyester or mixtures of both, and B. at least one inorganic substance with an average particle diameter ($d_{50}$) (weight average) of 0.1 to 100 nm, preferably 1 to 50 nm, most preferably 1 to 30 nm. Preferred amounts of B. are 0.1 to 50% by weight, more preferably 0.1 to 30% by weight, most preferably 0.1 to 10% by weight (with respect to A).

Thermoplastic Polymers A

Thermoplastic polymers A may be homopolymers or copolymers of styrene or substituted styrene and condensation polymers of bifunctional reactive compounds. Mixtures of polymers of this type are also suitable.

Polymers are particularly suitable which exhibit no crystalline regions in their processed solid state, i.e. which are completely amorphous.

In this respect, "amorphous" is understood to be the polymer state described in L. H. Sperling: Introduction to Physical Polymer Science, J. Wiley & Sons, 1986, page 123.

Examples of homopolymers and copolymers of ethylenically unsaturated monomers containing one or more vinyl groups ("vinyl polymers") include those of the monomers vinyl acetate, styrene, α-methylstyrene, styrenes with substituted nuclei, acrylonitrile, methacrylonitrile, methyl methacrylate, maleic anhydride, N-substituted maleic imides, chloroprene, 1,3-butadiene, and $C_1$–$C_8$ alkyl acrylates and methacrylates.

The following are particularly suitable:
vinyl polymers which are free from rubber (A.1)
vinyl polymers containing rubber, e.g. graft polymers of vinyl monomers on a rubber (A.2)
mixtures of vinyl polymers which are free from rubber (A.1) and which contain rubber (A.2).

The preferred vinyl polymers A.1 are copolymers of, firstly, styrene, α-methylstyrene, styrene with a substituted nucleus, or mixtures (A.1.1), and, secondly, acrylonitrile, methacrylonitrile, methyl methacrylate, maleic anhydride, N-substituted maleic imide or mixtures (A.1.2).

These copolymers preferably contain 50 to 98% by weight A.1.1 and 50 to 2% by weight A.1.2.

Copolymers A.1 which are particularly preferred include those of styrene, acrylonitrile and optionally methyl methacrylate, of α-methylstyrene, acrylonitrile and optionally methyl methacrylate, and of styrene, α-methylstyrene, acrylonitrile and optionally methyl methacrylate.

The best known are the styrene-acrylonitrile copolymers, which can be produced by radical-initiated polymerisation, particularly by emulsion, suspension, solution or bulk polymerisation. Copolymers A.1 preferably have molecular weights $\overline{M}_w$ (weight average, determined by light scattering or sedimentation) of 15,000 to 200,000.

Other copolymers A.1 which are particularly preferred include randomly structured copolymers of styrene and maleic anhydride, which can be produced from the corresponding monomers by continuous solution or bulk polymerisation with incomplete conversion, for example. Their composition can be varied within wide limits. They preferably contain 5 to 25% by weight of maleic anhydride units.

Instead of styrene, these polymers may also contain styrenes with substituted nuclei, such as p-methylstyrene, vinyltoluene, 2,4-dimethylstyrene and other substituted styrenes, such as α-methylstyrene.

The rubber-containing vinyl polymers A.2 comprise, for example, graft copolymers with rubber-like elastic properties, which can essentially be obtained from at least two of the following monomers: chloroprene, 1,3-butadiene, isopropene, styrene, acrylonitrile, ethylene, propylene, vinyl acetate, or $C_1$–$C_{18}$ alkyl acrylates and methacrylates. Polymers such as these are described, for example, in "Methoden der organischen Chemie" (Houben-Weyl), Volume 14/1, Georg Thieme-Verlag, Stuttgart, 1961, pages 393–406 and in C. B. Bucknell, "Toughened Plastics", Appl. Science Publishers, London 1977. The preferred polymers A.2 are partially crosslinked and have gel contents greater than 20% by weight, preferably greater than 40% by weight, particularly greater than 60% by weight.

The preferred rubber-like vinyl polymers A.2 are graft polymers of:

A.2.1 5 to 95, preferably 30 to 80, parts by weight of a mixture comprising

A.2.1.1 50 to 95 parts by weight styrene, α-methylstyrene, styrenes with halogen- or methyl-substituted nuclei, methyl methacrylate or mixtures of these compounds, and A.2.1.2 5 to 50 parts by weight acrylonitrile, methacrylonitrile, methyl methacrylate, maleic anhydride, $C_1$–$C_4$ alkyl- or phenyl-N-substituted maleic imides or mixtures of these compounds, on A.2.2 5 to 95, preferably 20 to 70, parts by weight of a rubber polymer with a glass transition temperature below –10° C.

Examples of preferred graft polymers A.2 include polybutadienes, butadiene/styrene copolymers and acrylate rubbers grafted with styrene and/or acrylonitrile and/or alkyl acrylates or methacrylates; i.e. copolymers of the type described in DE-OS 1 694 173) (=U.S. Pat. No. 3,564,077); polybutadienes, butadiene/styrene- and/or butadiene/acrylonitrile copolymers, polyisobutenes or polyisopropenes grafted with acrylic or methacrylic acid alkyl esters, vinyl acetate, acrylonitrile, styrene and/or alkylstyrenes, such as those described in DE-OS 2 348 377 (=U.S. Pat. No. 3,919,353) for example.

Polymers A.2 which are particularly preferred are ABS polymers, such as those described in DE-OS 2 035 390 (=U.S. Pat. No. 3,644,574) and in DE-OS 2 248 242 (=GB-PS 1 409 275) for example.

The polymers A.2 which are particularly preferred are obtainable by the graft polymerisation of:

α. 10 to 70, preferably 15 to 50, particularly 20 to 40% by weight, with respect to graft polymer A.2, of acrylic acid esters or methacrylic acid esters, or from 10 to 70, preferably 15 to 50, particularly 20 to 40% by weight of a mixture of 10 to 50, preferably 20 to 35% by weight, with respect to the mixture, of acrylonitrile, acrylic acid esters or methacrylic acid esters, and 50 to 90, preferably 65 to 80% by weight, with respect to the mixture, of styrene (as graft layer A.2.1), on β. 30 to 90, preferably 50 to 85, particularly 60 to 80% by weight, with respect to graft polymer A.2, of a butadiene polymer containing at least 50% by weight, with respect to β, of butadiene radicals (as graft base A.2.2), wherein the gel content of graft base β is preferably at least 40% by weight (measured in toluene), the degree of grafting G is 0.15 to 0.55, and the average particle diameter $d_{50}$ of graft polymer A.2 is 0.05 to 2 μm, preferably 0.1 to 0.6 μm.

Acrylic acid esters or methacrylic acid esters α are esters of acrylic acid or methacrylic acid and monohydric alcohols containing 1 to 18 C atoms. Methyl methacrylate, ethyl methacrylate, propyl methacrylate, n-butyl acrylate, t-butyl acrylate and t-butyl methacrylate are particularly preferred.

Apart from butadiene radicals, butadiene polymer β may contain up to 50% by weight, with respect to β, of radicals of other ethylenically unsaturated monomers, such as styrene, acrylonitrile, $C_1$–$C_4$ alkyl esters or acrylic or methacrylic acid (such as methyl acrylate, ethyl acrylate, methyl methacrylate, ethyl methacrylate), vinyl esters and/or vinyl ethers. Polybutadiene is preferred.

During graft polymerisation, the graft monomers, as is known, are not completely polymerised on to the graft base. According to the invention, however, graft polymers A.2 include products which are obtained by polymerisation of the graft monomers in the presence of the graft base.

The degree of grafting G is the ratio of the graft monomers, which are grafted on, to the graft base (dimensionless number).

The average particle diameter $d_{50}$ is the diameter, above and below which 50% by weight of the particles are situated. It can be determined by means of ultracentrifuge measurements (W. Scholtan, H. Lange, Kolloid, Z. und Z. Polymere 250 (1972), 782–796).

Other particularly preferred polymers A.2 are graft polymers of

τ. 20 to 90% by weight, with respect to A.2, of acrylate rubber with a glass transition temperature below –20° C. as graft base A.2.2, and δ. 10 to 80% by weight, with respect to A.2, of at least one polymerisable, ethylenically unsaturated monomer as graft monomer A.2.1, the homo- or copolymers of which would have a glass transition temperature above 25° C. when formed in the absence of 1.

The acrylate rubbers τ of polymers A.2 are preferably polymers of acrylic acid alkyl esters, optionally with up to 40% by weight, with respect to τ, of other polymerisable, ethylenically unsaturated monomers. The preferred polymerisable acrylic acid esters include $C_1$–$C_8$ alkyl esters, for example methyl, ethyl, butyl, n-octyl and 2-ethyl-hexyl esters; halogenoalkyl esters, preferably halogeno-$C_1$–$C_8$ alkyl esters such as chloroethyl acrylate, as well as mixtures of these monomers.

Monomers containing more than one polymerisable double bond may be copolymerised for crosslinking. Preferred examples of crosslining monomers include esters of unsaturated monocarboxylic acids containing 3 to 8 C atoms and unsaturated monohydric alcohols containing 3 to 12 C atoms, or saturated polyols containing 2 to 4 OH groups and 2 to 20 C atoms, such as ethylene glycol dimethacrylate or allyl methacrylate for example; multiply-unsaturated heterocyclic compounds, such as trivinyl and triallyl cyanurate for example; polyfunctional vinyl compounds such as di- and trivinylbenzenes; and also triallyl phosphate and diallyl phthalate.

The preferred crosslinking monomers are allyl methacrylate, ethylene glycol dimethacrylate, diallyl phthalate, and heterocyclic compounds which contain at least three ethylenically unsaturated groups.

Crosslinking monomers which are particularly preferred are the cyclic monomers triallyl cyanurate, triallyl isocyanurate, trivinyl cyanurate, triacryloyl hexahydro-s-triazine and triallylbenzenes.

The amount of crosslinking monomers is preferably 0.02 to 0.5, particularly 0.05 to 2% by weight, with respect to the graft base τ.

It is advantageous to restrict the amount of cyclic crosslinking monomers which contain at least 3 ethylenically unsaturated groups to less than 1% by weight of the graft base τ.

Examples of preferred "other" polymerisable, ethylenically unsaturated monomers which can be used apart from acrylic acid esters for the production of the graft base, include acrylonitrile, styrene, α-methylstyrene, acrylamides, vinyl-$C_1$–$C_6$-alkyl ethers, methyl methacrylate and butadiene. Acrylate rubbers which are preferred as the graft base τ are emulsion polymers which have a gel content of at least 60% by weight.

Other suitable graft bases as defined by A.2.2 include silicone rubbers with graft-active sites, such as those described in DE-OS 37 04 657, DE-OS 37 04 655, DE-OS 36 31 540 and DE-OS 36 31 539.

The gel content of graft base A.2.2. is determined in dimethylformamide at 25° C. (M. Hoffmann, H. Krömer, R. Kuhn, Polymeranalytik I and II, Georg-Thieme-Verlag, Stuttgart 1977).

Graft polymers A.2 can be produced by known methods, such as bulk, suspension, emulsion or bulk-suspension methods.

Thermoplastic polymers A may also be condensation polymers which have been produced by condensation polymerisation from at least one reactive compound. They are preferably polycarbonates and/or polyesters.

The preferred polycarbonates are those based on diphenols of formula (I)

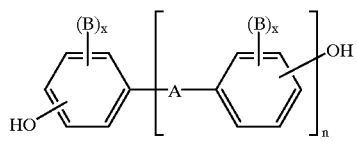

(I)

where

A is a single bond, a $C_1$–$C_5$ alkylene, a $C_2$–$C_5$ alkylidene, a $C_5$–$C_6$ cycloalkylidene, —S— or —$SO_2$—, B is chlorine or bromine X is 0, 1 or 2, and n is 1 or 0.

Polycarbonates which are suitable according to the invention include both homopolycarbonates and copolycarbonates.

A may also be a mixture of the thermoplastic polycarbonates defined above.

Polycarbonates can be produced in the known manner from diphenols with phosgene by the phase boundary process, or with phosgene by the process in homogeneous phase, the so-called pyridine process, wherein the molecular weight can be adjusted in the known manner by a corresponding amount of known chain terminators.

Examples of suitable chain terminators include phenol, p-chlorophenol, p-tert.-butylphenol or 2,4,6-tribromophenol, and also long chain alkylphenols such as 4-(1,3)-tetramethylbutyl)-phenol according to DE-OS 2 842 005 (Le A 19 006) or a monoalkylphenol or dialkylphenol with a total of 8–20 C atoms in the alkyl substituents according to German Patent Application P 3 506 472.2, such as 3,5-di-tert.-butylphenol, p-iso-octylphenol, p-tert.-octylphenol, p-dodecylphenol, and 2-(3,5-dimethyl-heptyl)-phenol and 4-(3,5-dimethylheptyl)-phenol.

The amount of chain terminators is generally between 0.5 and 10 mole % with respect to the sum of the diphenols (I) used in each case.

The polycarbonates A which are suitable according to the invention have average molecular weights ($\overline{M}_w$, weight average, measured by ultracentrifuging or by scattered light measurement) of 10,000 to 200,000, preferably from 20,000 to 80,000.

Examples of suitable diphenols of formula (I) include hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxy-phenyl)-propane or 2,2-bis-(3,5-dibromo-4-hydroxyphenyl)-propane.

The preferred diphenols of formula (I) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

The preferred diphenols also include alkyl-substituted dihydroxydiphenylcycloalkanes of formula (II)

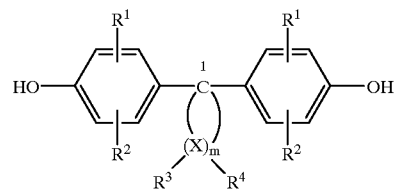

(II)

where $R^1$ and $R^2$ represent, independently of each other, hydrogen, a halogen, preferably chlorine or bromine, a $C_1$–$C_8$ alkyl, a $C_5$–$C_6$ cycloalkyl, a $C_6$–$C_{10}$ aryl, preferably phenyl, and a $C_7$–$C_{12}$ aralkyl, preferably a phenyl-$C_1$–$C_4$ alkyl, particularly benzyl, m is an integer from 4 to 7, preferably 4 or 5, $R^3$ and $R^4$ represent, independently of each other, hydrogen or a $C_1$–$C_6$ alkyl, and are individually selectable for each X, and x represents carbon, with the proviso that $R^3$ and $R^4$ simultaneously represent alkyl on at least one X atom.

The polycarbonates A which are suitable according to the invention may be branched in the known manner, preferably by the incorporation of 0.05 to 2.0 mole %, with respect to the sum of the diphenols used, of trifunctional compounds or compounds with a functionality greater than three, e.g. those containing three or more than three phenolic groups.

Apart from bisphenol A homopolycarbonate, preferred polycarbonates include the copolycarbonates of bisphenol A containing up to 15 mole %, with respect to the molar sum of diphenols, of 2,2-bis-(3,5-dibromo-4-hydroxyphenyl)-propane.

The polycarbonates A may be partially or completely replaced by aromatic polyester carbonates.

The preferred polyesters A are polyalkylene terephthalates. These are reaction products of aromatic dicarboxylic acids (or reactive derivatives thereof, e.g. dimethyl esters or anhydrides) and aliphatic, cycloaliphatic or arylaliphatic diols, and mixtures of reaction products such as these.

The preferred polyalkylene terephthalates can be produced from terephthalic acids (or reactive derivatives thereof) and aliphatic and cycloaliphatic diols containing 2 to 10 C atoms, by known methods (Kunststoff-Handbuch, Volume VIII, page 695 et seq., Carl Hanser Verlag, Munich 1973).

The preferred polyalkylene terephthalates contain 80 to 100, preferably 90 to 100 mole %, with respect to the dicarboxylic acid component, of terephthalic acid radicals, and 80 to 100, preferably 90 to 100 mole %, with respect to the diol component, of ethylene glycol and/or 1,4-butanediol radicals. Apart from terephthalic acid radicals, they contain 0 to 20 mole % of radicals of other aromatic dicarboxylic acids containing 8 to 14 C atoms or of aliphatic dicarboxylic acids containing 4 to 12 C atoms, such as radicals of phthalic acid, isophthalic acid, naphthalene-2,6-dicarboxylic acid, 4,4'-diphenyldicarboxylic acid, succinic, adipic, sebacic, azelaic or cyclohexanediacetic acid. Apart from ethylene glycol and/or 1,4-butanediol radicals, they contain 0 to 20 mole % of other aliphatic diols containing 3 to 12 C atoms or cycloaliphatic diols containing 6 to 12 C atoms, e.g. radicals of 1,5-pentanediol, 1,6-hexanediol, cyclohexane-1, 4-dimethanol, 3-methyl-1,3-pentanediol and -1,6-pentanediol, 2-ethyl-1,3-hexanediol, 2,2-diethyl-1,3-propanediol, 2,5-hexanediol, 1-4-di(3-β-hydroxyethoxyphenyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS-2 407 647, 2 407 776, 2 715 932).

The polyalkylene terephthalates may be branched by the incorporation of relatively small amounts of tri- or tetrahydric alcohols or tri- or tetrabasic carboxylic acids, such as those described in DE-OS 1 900 270 and U.S. Pat. No. 3,692,744. Examples of preferred branching agents include trimesic acid, trimellitic acid, trimethylolethane and -propane and pentaerythritol. It is advisable to use not more than 1 mole % of the branching agent with respect to the acid component.

Polyalkylene terephthalates are particularly preferred which have been produced solely from terephthalic acid (or reactive derivatives thereof, e.g. dialkyl esters thereof) and ethanediol and/or 1,4-butanediol, and mixtures thereof.

The preferred polyalkylene terephthalates also include copolyesters which are produced from at least two of the aforementioned diols; poly-(ethylene glycol/1,4-butanediol) terephthalates are particularly preferred copolyesters. The different diol radicals may be present in the copolyesters in the form of blocks, or they may be randomly distributed.

The polyalkylene terephthalates generally have an intrinsic viscosity of 0.4 to 1.4 dl/g, preferably 0.5 to 1.3 dl/g, particularly 0.6 to 1.2 dl/g, measured in phenol/o-dichlorobenzene (1:1 parts by weight) at 25° C. in each case.

Superfine Inorganic Materials B

Component B comprises compounds of one or more elements, preferably metals, of the 1st to 6th main group and of the 1st to 8th sub-group (transition elements) of the periodic table, preferably of the 1st to 4th main group and of the 4th to 8th sub-group, most preferably of the 2nd to 4th main group and of the 4th to 8th sub-group, with at least one element from the group comprising oxygen, carbon, nitrogen, phosphorus, silicon, fluorine, chlorine, bromine, iodine and sulphur.

The periodic table is defined in Hollemann-Wiberg, "Lehrbuch der Anorganischen Chemie", Verlag Walter de Gruyter, Berlin, New York, 1985.

The superfine inorganic materials preferably consist of $BaSO_4$, TiN, $TiO_2$, TaC, SiC, WC, $WO_3$, $ZrO_2$ or iron oxides. Mixtures and doped compounds can also be used. $BaSO_4$, $TiO_2$ and $ZrO_2$ are particularly preferred. $BaSO_4$ is most particularly preferred.

The superfine inorganic materials may be incorporated in the synthetic thermoplastic materials A by the usual methods, for example by the direct kneading or extrusion of synthetic material A and the superfine inorganic powders B. The preferred methods constitute the preparation of a master batch, e.g. of flame retardant additives and other additives, monomers or solvents, or the co-precipitation of thermoplastic A and the superfine inorganic powders, e.g. by co-precipitation of an aqueous emulsion and the superfine inorganic powders.

The production of superfine inorganic materials in the presence of aqueous polymer systems, e.g. ABS latices, is in accordance with the invention. Superfine inorganic materials are thereby incorporated in the thermoplastic moulding compositions without separate work-up.

The average particle diameters ($d_{50}$) are 0.1 to 100 nm, preferably 1 to 50 nm, most preferably 1 to 30 nm.

The terms particle size and particle diameter always denote the average diameter $d_{50}$. This can be determined, for example, by ultracentrifuge measurements according to W. Scholtan et al., Kolloid-Z. und Z. Polymere 250 (1972), pages 782 to 796 (this is preferred for dispersions), or by transmission electron microscopy (this is preferred for thermoplastic moulding compositions).

The moulding compositions according to the invention contain at least one thermoplastic polymer based on unsaturated monomers containing at least one styrene (derivative) or at least one condensation polymer of bifunctional reactive compounds or mixtures thereof, and at least one inorganic material with an average particle diameter ($d_{50}$) of 0.1 to 100 nm, preferably 1 to 50 nm, most preferably 1 to 30 nm. The preferred amounts of inorganic superfine materials are 0.1 to 50% by weight, more preferably 0.1 to 30% by weight, most preferably 0.1 to 10% by weight (with respect to thermoplastic moulding compositions A).

Substances which are also suitable for increasing the X-ray contrast include all customary fillers, e.g. pigments, colorants, fibres, which contain elements, the atomic number of which is greater than that of the element with the highest atomic number in the plastic used, and the particle diameter of which falls within the range according to the invention.

Apart from the compounds according to the invention, the moulding compositions may contain customary additives such as pigments, fillers, stabilisers, anti-static agents, slip additives, demoulding agents or flame retardants, provided that these do not reduce the toughness.

PRODUCTION AND TESTING OF THE MOULDING COMPOSITIONS ACCORDING TO THE INVENTION

EXAMPLE 1

(Comparative)

Commercially available $BaSO_4$ (Barifine BF20, Nordmann+Rassmann, particle size about 25 μm) was incorporated in an acrylonitrile-butadiene-styrene copolymer (ABS) by melting the polymer in the presence of $BaSO_4$, mixing the components, and injection moulding the mixture directly. The average particle size of the $BaSO_4$ in the polymer (image evaluation from transmission electron microscopy) was about 25 μm, and the $BaSO_4$ concentration was 10% by weight (polymer P1).

Production of injection moulded parts for measuring the properties of polymers P1, P2, P2A, P3, P4, P5 and P6 was effected by pre-mixing the components ("dry blending") and subsequent direct processing. For this purpose the mixture was melted and injection moulded directly. The processing temperature was 250° C.; the mould temperature was 70° C.

EXAMPLE 2

(According to the Invention)

Superfine $BaSO_4$ was produced in situ in the presence of an SAN latex. For this purpose, 5.261 kg of SAN latex (solids content: 43.55% by weight) were placed in a vessel and 22.2 g sodium dodecyl sulphate (DDS) in 380 g water were added drop-wise over 50 minutes. 244.7 g $Na_2SO_4$ in 4600 g water were then added drop-wise over 2.5 hours.

This was followed by the addition of 367 g Ba(acetate)$_2$ in 4000 g water over 2.5 hours at a stirrer speed of 430 rpm. Barium was present as a stoichiometric deficit in relation to sulphate.

The latex was subsequently precipitated. For this purpose, a precipitation bath consisting of 11.5 l water, 115 ml conc. acetic acid and 230 g magnesium sulphate (MgSO$_4$.7H$_2$O) was placed in a vessel. The bath was heated to 95° C. The dispersion was added with stirring, heated to 100° C. and allowed to stand for 10 minutes at this temperature. The precipitate was cooled by the addition of water and washed free from sulphate on a plane filter. The powder produced was dried at 70° C. (polymer P2). The average particle diameter of the BaSO$_4$ in the polymer (image evaluation from transmission electron microscopy) was about 40 nm.

Polymer P2 was mixed with an ABS graft powder and injection moulded. The BaSO$_4$ content in the final product was 10% by weight. The average particle size of the BaSO$_4$ in the polymer (image evaluation from transmission electron microscopy) was about 40 nm (polymer P2A).

EXAMPLE 3

(Comparative)

Commercially available BaSO$_4$ (Barifine BF 20, Nordmann+Rassmann, average particle diameter about 25 µm) was incorporated in an acrylonitrile-styrene copolymer (SAN) by melting the polymer in the presence of BaSO$_4$, mixing the components, and injection moulding the mixture directly. The average particle diameter of the BaSO$_4$ in the polymer (image evaluation from transmission electron microscopy) was about 25 µm, and the BaSO$_4$ concentration was 10% by weight (polymer P3). The polymer matrix was transparent without BaSO$_4$.

EXAMPLE 4

(According to the Invention)

The powder prepared in Example 2 (polymer P2), consisting of superfine BaSO$_4$ in precipitated, dried SAN latex, was not mixed with an ABS graft powder as in Example 2, but was mixed with SAN (polymer P4). The average particle diameter of the BaSO$_4$ in the polymer (image evaluation from transmission electron microscopy) was about 40 nm, and the BaSO$_4$ concentration was 10% by weight (polymer P3). The polymer matrix was transparent without BaSO$_4$.

EXAMPLE 5

(Comparative)

SAN was mixed with ABS graft powder (polymer P5) and injection moulded.

EXAMPLE 6

(Comparative)

SAN was injection moulded for comparison purposes (polymer P6).

The polymer composition of polymers P1, P2A and P5 was identical. These polymers had the following composition:

The acrylonitrile-butadiene-styrene polymers (ABS) consisted of 63.64% by weight SAN resin and 36.36% by weight ABS graft powder. SAN is a thermoplastic resin consisting of 28% by weight acrylonitrile and 72% by weight styrene. SAN can be produced by emulsion polymerisation (SAN latex) or by bulk methods. The viscosity of SAN resin is characterised by the L value (L value=$\eta_{spec./c}$ at c=5 g/l in DMF at 25° C.). The L value of the SAN resin used was 60.

ABS graft powder is produced by the emulsion polymerisation of styrene and acrylonitrile in the presence of an aqueous polybutadiene emulsion (polybutadiene graft base). Styrene and acrylonitrile are grafted on to the polybutadiene particles in the course of this procedure. As is known, grafting is not a complete process, so that free SAN is also present in ABS graft powder in addition to grafted SAN. The ABS graft powder consisted of 55% by weight polybutadiene and 45% by weight SAN (styrene:acrylonitrile=72% by weight: 28% by weight). The particle size of the polybutadiene graft base was 0.4 µm.

The polymer composition of polymers P3, P4 and P6 was identical. These polymers had the following composition:

The styrene-acrylonitrile polymer (SAN) constituted a transparent, thermoplastic resin consisting of 28% by weight acrylonitrile and 72% by weight styrene. SAN can be produced by emulsion polymerisation (SAN latex) or by bulk methods. The viscosity of SAN resin is characterised by the L value (L value=$\eta_{spec./c}$ at c=5 g/l in DMF at 25° C.). The L value of the SAN resin used was 60.

Comparison of Polymers P1, P5 and P2A

In order to compare the properties of conventional BaSO$_4$ and of superfine BaSO$_4$ in thermoplastic moulding compositions, the thermoplastic moulding compositions were injection moulded and the following tests were performed:

a) Notched Bar Impact Strength (a$_k$)

Bars of dimensions 80×10×4 mm$^3$, on which the notched bar impact strength was measured at room temperature by the method according to ISO 180 1 A, were produced by injection moulding.

b) Modulus of Elasticity in Tension

Bars with shoulders ("tensile test bar No. 3") were produced by injection moulding. Tensile tests were performed on these bars according to DIN 53 455, and their modulus of elasticity was determined according to DIN 53 457.

c) Resistance to Thermal Deformation (Vicat B 120)

Bars of dimensions 80×10×4 mm$^3$, on which the Vicat softening temperature (VST) was determined according to ISO 306, were produced by injection moulding.

d) ESC Behaviour (Resistance to Petrol)

The resistance to petrol (stress cracking behaviour) was tested using flat bars of dimensions 80×10×4 mm$^3$, according to DIN 53 449/3. A mixture of 50% by weight toluene and 50% by weight iso-octane was used as a simulated fuel. The test specimens were pre-stretched by means of a former in the shape of a circular arc and were placed in the simulated fuel for 5 minutes at 23° C. The stress cracking behaviour was assessed by way of the crack formation or fracture. The pre-stretching at which a fracture occurred after 5 minutes is given in the following Table.

The results of the tests are summarised in the following Table:

| Polymer | BaSO$_4$ [% by weight] | Superfine BaSO$_4$ [% by weight] | ak [kJ/m$^2$] | Modulus of elasticity [N/mm$^2$] | Vicat B 120 [° C.] | Pre-stretching to fracture |
|---|---|---|---|---|---|---|
| P5 | — | — | 19 | 2330 | 99 | 0.6 |
| P1 | 10 | — | 4 | 2560 | 100 | 0.4 |
| P2A (according to the invention) | — | 10 | 12 | 2500 | 103 | 2.4 |

At 10% by weight of superfine BaSO$_4$, the notched bar impact strength was of a level which was acceptable for ABS, whilst the notched bar impact strength fell drastically with 10% by weight of commercially available BaSO$_4$ (reduction to about ⅕ of the initial level). Even small amounts of commercially available BaSO$_4$ (1.5% by weight) resulted in a decrease in toughness to about half of the initial level.

The resistance to petrol, expressed as the edge fibre elongation to fracture, was significantly improved by the addition of superfine BaSO$_4$. The addition of conventional BaSO$_4$ did not improve this property.

Polymer P5 exhibited no X-ray contrast in the X-ray experiment, Under the same conditions, polymer P1 exhibited a clear, somewhat diffuse X-ray contrast, whilst polymer P2A according to the invention exhibited a clear, sharp X-ray contrast under the same conditions.

Comparison of P4, P3 and P6

The transparency of SAN, a transparent polymer, was compared after the addition of commercially available BaSO$_4$ and of superfine BaSO$_4$. The haze was measured according to ASTM D 1003.

The thickness of the test specimens was 2 mm.

The results of the tests are summarised in the following Table:

| Polymer | BaSO$_4$ [% by weight] | Superfine BaSO$_4$ [% by weight] | Haze [%] |
|---|---|---|---|
| P6 | — | — | 34 |
| P3 | 10 | — | 89 |
| P4 (according to the invention) | — | 10 | 56 |

We claim:

1. A thermoplastic moulding composition containing
    A) a thermoplastic polymer selected from
        A.1) copolymers of firstly styrene, α-methylstyrene, styrene with a substituted nucleus or mixtures thereof of 50 to 98% by weight, and, secondly, of acrylonitrile, methacrylonitrile, methyl methacrylate, maleic anhydride, an N-substituted maleic imide or mixtures thereof of 50 to 2% by % by weight,
        A.2) graft polymers of
            A.2.1) 5 to 95 parts by weight of a mixture of
                A.2.1.1) 50 to 95 parts by weight of styrene, α-methylstyrene, styrenes with halogen- or alkyl-substituted nuclei, C$_1$–C$_8$ alkyl methacrylates, C$_1$–C$_8$ alkyl acrylates or mixtures of these compounds, and
                A.2.1.2) 5 to 50 parts by weight of acrylonitrile, methacrylonitrile, C$_1$–C$_8$ alkyl methacrylates, C$_1$–C$_8$ alkyl acrylates, maleic anhydride, C$_1$–C$_4$ alkyl- or phenyl-N-substituted maleic imides or mixtures of these compounds, on
            A.2.2) 5 to 95 parts by weight of a rubber with a glass transition temperature below −10° C.,
        or mixtures A.1) and A.2) and optionally a thermoplastic polycarbonate and
    B) 0.1 to 50% by weight, with respect to A), of BaSO$_4$, with an average particle diameter of 0.1 to 100 nm.

2. A moulding composition according to claim 1, wherein A) is a mixture of a thermoplastic polycarbonate, a copolymer A.1) and a graft polymer A.2).

3. A molding composition according to claim 1, including additives consisting of pigments, fillers, stabilisers, antistatic agents, slip additives, demoulding agents and flame retardants.

4. A molding composition according to claim 1, wherein BaSO$_4$ has an average particle size of 1 to 50 nm.

5. A molding composition according to claim 4, wherein BaSO$_4$ has an average particle size of 1 to 30 nm.

6. A molding composition according to claim 1, wherein the weight of BaSO$_4$ with respect to A) is 0.1 to 30%.

7. A molding composition according to claim 6, wherein the weight of BaSO$_4$ with respect to A) is 0.1 to 10%.

8. A thermoplastic moulding composition consisting of
    A) a thermoplastic polymer selected from
        A.1) copolymers of firstly styrene, α-methylstyrene, styrene with a substituted nucleus or mixtures thereof of 50 to 98% by weight, and, secondly, of acrylonitrile, methacrylonitrile, methyl methacrylate, maleic anhydride, an N-substituted maleic imide or mixtures thereof of 50 to 2% by weight,
        A.2) graft polymers of
            A.2.1) 5 to 95 parts by weight of a mixture of
                A.2.1.1) 50 to 95 parts by weight of styrene, α-methylstyrene, styrenes with halogen- or alkyl-substituted nuclei, C$_1$–C$_8$ alkyl methacrylates, C$_1$–C$_8$ alkyl acrylates or mixtures of these compounds, and
                A.2.1.2) 5 to 50 parts by weight of acrylonitrile, methacrylonitrile, C$_1$–C$_8$ alkyl methacrylates, C$_1$–C$_8$ alkyl acrylates, maleic anhydride, C$_1$–C$_4$ alkyl- or phenyl-N-substituted maleic imides or mixtures of these compounds, on
            A.2.2) 5 to 95 parts by weight of a rubber with a glass transition temperature below −10° C.,
        or mixtures A.1) and A.2) and optionally a thermoplastic polycarbonate and
    B) 0.1 to 50% by weight, with respect to A), of BaSO$_4$, with an average particle diameter of 0.1 to 100 nm.

* * * * *